June 2, 1925.　　　　　　　　　　　　　　1,540,346
C. A. KUNZ
DUST COLLECTOR
Filed Oct. 2, 1924　　　　　　　3 Sheets-Sheet 3

Inventor
Charles A. Kunz
By Mason, Fenwick & Lawrence
Attorneys

Patented June 2, 1925.

1,540,346

UNITED STATES PATENT OFFICE.

CHARLES A. KUNZ, OF DUBUQUE, IOWA, ASSIGNOR TO CHARLES A. KUNZ COMPANY, OF DUBUQUE, IOWA, A CORPORATION OF IOWA.

DUST COLLECTOR.

Application filed October 2, 1924. Serial No. 741,234.

*To all whom it may concern:*

Be it known that I, CHARLES A. KUNZ, a citizen of the United States, residing at Dubuque, in the county of Dubuque and State of Iowa, have invented certain new and useful Improvements in Dust Collectors; and I do hereby declare the following to be a full, clear, and exact description of the invention, such as will enable others skilled in the art to which it appertains to make and use the same.

This invention relates to dust separators and collectors, and more particularly to an improved form of dust separator and collector which will positively separate the dust from the dust laden air which is fed into the apparatus and collect the same in the bottom of the machine, while the cleansed or purified air is discharged through one or more screened exits or ventilators at the top of the apparatus.

An object of the invention is to provide an improved dust separator and collector for receiving dust laden air from any location or place, and for separating and collecting the dust therefrom so that the surrounding atmosphere will not be polluted.

A further object of the invention is to provide an improved dust separator and collector which will be highly efficient in operation and quite inexpensive to manufacture.

Other objects will appear as the description proceeds.

In the accompanying drawings which form a part of my application,

Like characters of reference are used throughout the following specification and the accompanying drawings to designate corresponding parts.

Figure 1:
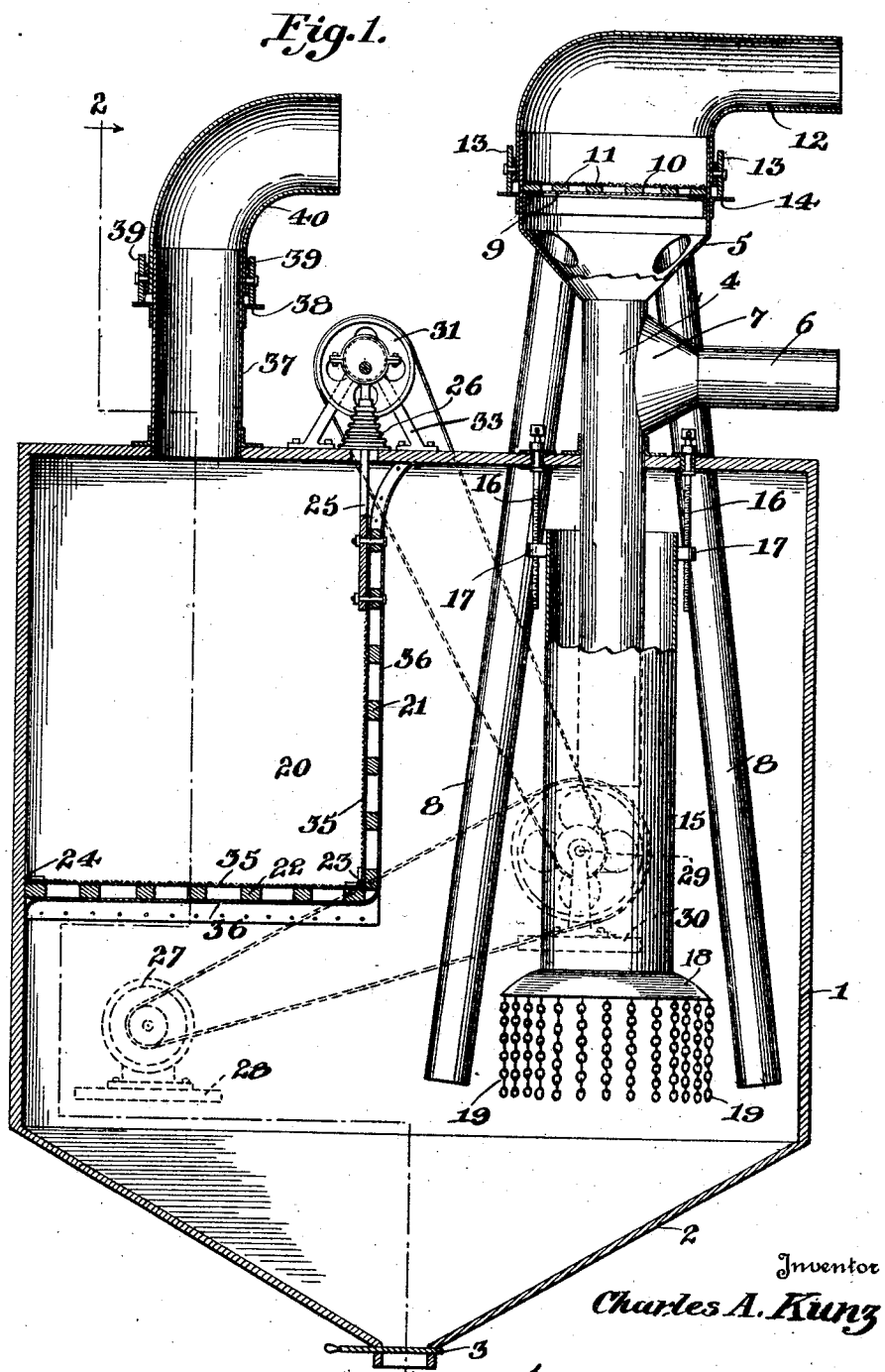
Figure 1 is a vertical longitudinal sectional view of my improved dust separator and collector.
Figure 2:
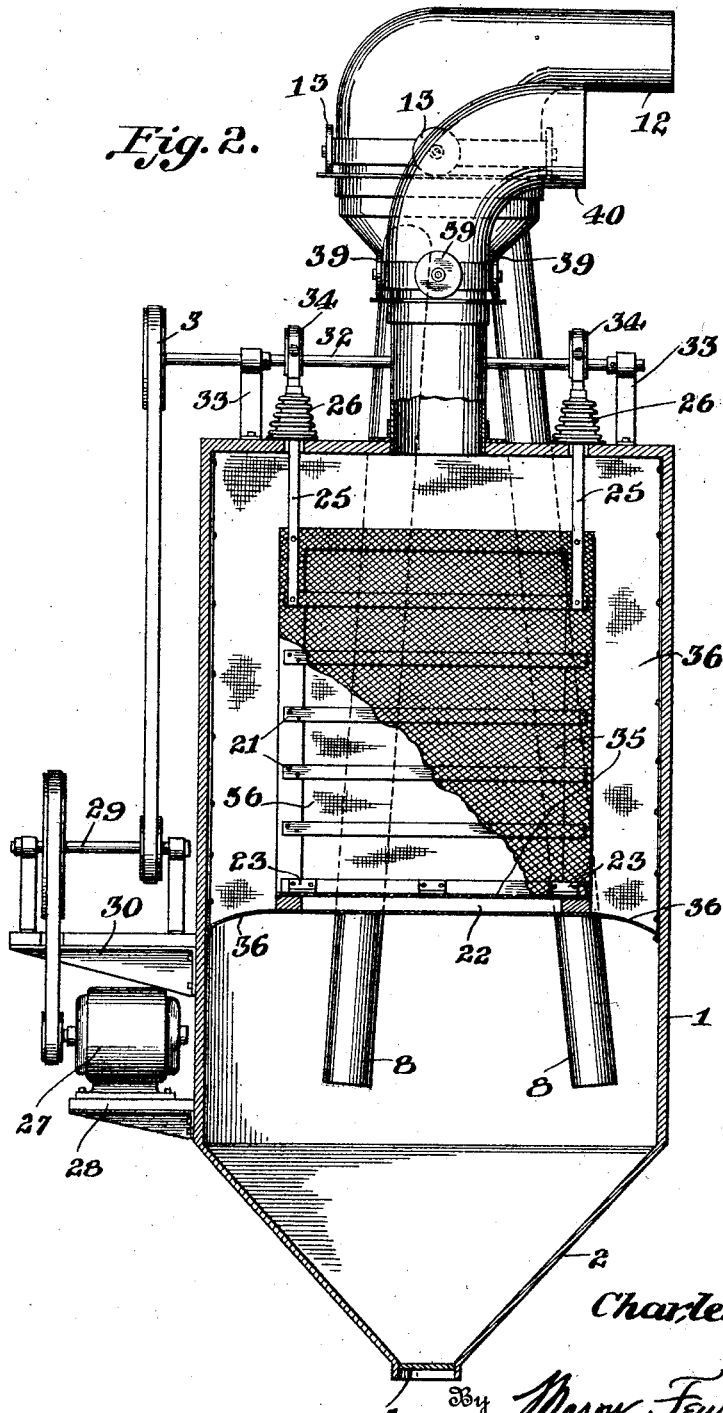
Fig. 2 is a transverse sectional view through the same.
Figure 3:
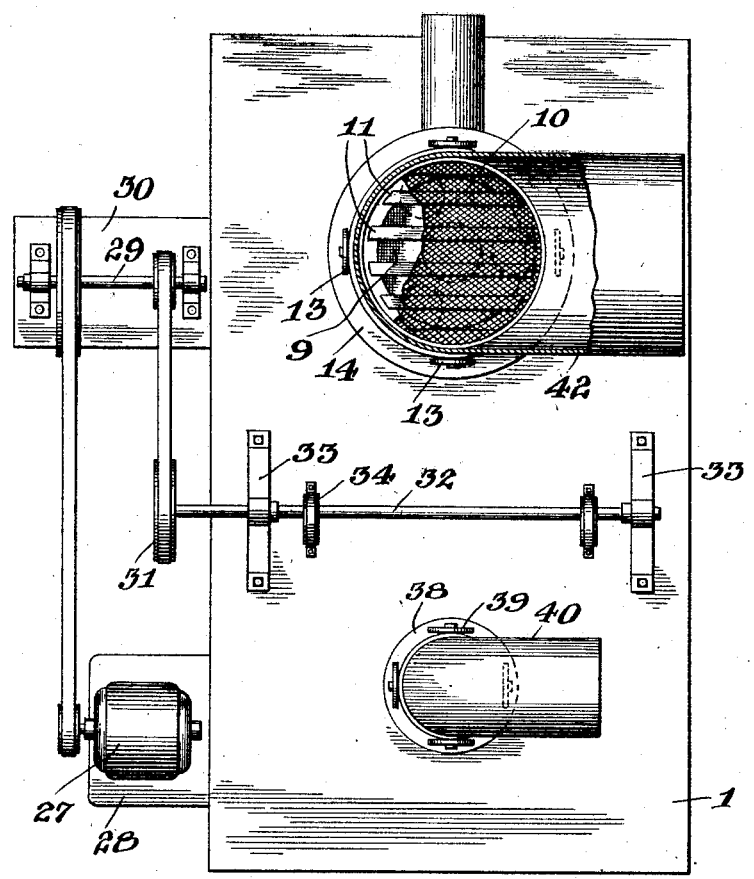
Fig. 3 is a plan view partly broken away in section.

My improved dust separator and collector comprises a substantially air-tight housing 1, which may be of any desired shape, and is provided with a suitable collecting chute 2 at the bottom thereof, which in turn may be provided with a controlling valve 3.

A conveyor tube 4 is positioned to extend into and above the housing 1, and is flared outwardly at its upper end to form the head or top portion 5. A dust and air receiving tube 6 is provided with a flared inner end 7 and connects with the said conveyor tube 4. The outer end of the tube 6 is connected to a suitable air collecting fan (not shown), which is adapted to draw the dust laden air into the receiving tube 6 and force the same through the conveyor tube 4, both in an upward and downward direction.

I preferably provide three downwardly extending discharge tubes 8, the same being connected in spaced relation about the flared head 5 and are in direct communication therewith. The tubes 8 extend into the housing 1 and terminate adjacent the bottom thereof, and are directed outwardly at a slight angle, as clearly illustrated in the drawings.

The upper end of the head portion 5 of the conveyor tube 4 is closed by means of the spaced layers of cloth 9 and netting 10, which are suitably secured to the interposed spaced slats 11, and serve to sieve the dust from the dust laden air so that the same will fall through the discharge tubes 8 into the bottom 2 of the housing 1, while the pure air will pass through the cloth 9 and netting 10 and out through the ventilator 12. The ventilator 12 is provided with a plurality of bearing wheels 13, which are adapted to run on the collar 14 positioned about the upper end of the top portion 5, and normally moves with the direction of the wind. It is preferable that the discharge tube 8 be approximately one third the diameter of the conveyor tube 4 for best results to be had when the apparatus is in operation.

A vertically adjustable air distributing tube 15 of considerably larger diameter than the conveyor tube 4 is supported in spaced relation about the tube 4 by means of the screws 16, which extend through the top of the housing 1 and through the nuts 17. The lower end of the tube 15 is provided with a flange or skirt 18, about the edge of which are disposed a plurality of lengths of chain 19, which are adapted to collect the dust, until the same drops off in chunks or solid pieces and falls into the collecting chute 2.

One portion of the housing 1 is formed into an air box or compartment 20 and is provided with the front and bottom slatted frames 21 and 22, which are hinged together at 23. The bottom frame 22 is also hinged at 24 to the inner wall of the housing 1, while the upper end of the frame 21 is supported by means of the eccentric rods 25, which extend up through the upper wall of the housing 1 and through suitable flexible dust collars 26.

A driving motor 27 is supported upon a standard 28 at one side of the housing 1, and is connected through a reduced speed mechanism 29 on the standard 30 adjacent thereto, to the pulley 31 on the shaft 32 mounted in the brackets 33. The eccentrics 34 on the shaft 32 are connected with the eccentric rods 25 so that the frames 21 and 22 will be vibrated.

The frames 21 and 22 are covered on their inner surfaces with a suitable netting or mesh 35, and are covered on their outer sides by the cloth, rubber, or canvas 36, which extends beyond the sides and ends of the said frames, and is secured to the inner walls of the housing 1 so that the frames and covering constitute a tightly closed air chamber.

An air discharge tube 37 extends through the top of the housing 1 and connects with the air chamber 20. An angle track collar 38 is positioned about the tube 37 on which run wheels 39 pivoted on the lower end of the ventilator elbow 40. Suitable packing may be used in the joints between the elbows 12 and 40, if desired. The elbow 40 will be adapted to turn with the direction of the wind.

From the foregoing description it will be apparent that the modus operandi is as follows: The dust laden air from a factory or building will be drawn by a motor driven fan into the inlet tube 6, whence part of the same will travel upwardly, and part downwardly in the inlet tube 4. The air which travels upwardly impinges against the cloth 9, and the cleansed air passes through the ventilator 12, while the dust and a small portion of the air passes down through the discharge tubes 8, whereupon the dust falls into and collects in the chute 2. The air which moves downwardly passes through the distributing tube 15, and most of the dust will collect on the chains 19, where it will finally drop into the chute 2.

The motor 27 will be continually vibrating the frames 21 and 22, and the dust striking the cloth or canvas covering the said frames will be thrown or deposited in the chute 2, while the air which passes through the cloth 36 and netting 35 will be thoroughly cleansed and will pass out through the elbow ventilator 40.

Thus it will be understood that the impure, dust laden air from factories or the like may be continually cleansed, and the pure air discharged back into the surrounding atmosphere.

Many minor changes in detail of construction may be resorted to without departure from the spirit of the invention.

Having thus described my invention, what I claim as new and desire to secure by Letters Patent of the United States is:

1. A dust separator and collector comprising a housing, a vertical conveyor tube extending therein, an air inlet tube communicating with said conveyor tube substantially above the inner end thereof at an angle thereto, and a screened ventilator at the outer end of said conveyor tube.

2. A dust separator and collector comprising a housing, a vertical conveyor tube extending therein, an air inlet tube attached to and communicating with said conveyor tube at an angle thereto and above the inner end thereof, a screened ventilator at the outer end of said conveyor tube, and a plurality of discharge tubes adjacent said screened ventilator terminating adjacent the bottom of said housing.

3. A dust separator and collector comprising a housing, a conveyor tube extending therein, an air inlet tube attached to said conveyor tube, a flared head formed on the upper end of said conveyor tube, a screened ventilator at the outer end thereof, a discharge tube extending from said flared head within said housing, and a vertically adjustable distributing tube positioned about said conveyor tube.

4. A dust separator and collector comprising a housing, a conveyor tube extending therein, an air inlet tube attached to said conveyor tube, a head formed on the upper end of said conveyor tube, a screen ventilator at the outer end thereof, a discharge tube extending from said flared head within said housing, a vertically adjustable flanged distributing tube positioned about said conveyor tube, and a plurality of dust collecting chains depending from said flange on said distributing tube.

5. A dust separator and collector comprising a housing, a conveyor tube extending therein, an air inlet tube attached to said conveyor tube, a head formed on the upper end of said conveyor tube, a screen ventilator at the outer end thereof, a discharge tube extending from said head within said housing, a vertically adjustable flanged distributing tube spaced about said conveyor tube, dust collecting means at the lower end thereof, and a dust collecting chute at the bottom of said housing.

6. A dust separator and collector comprising a housing, a dust collecting chute at the bottom thereof, means for admitting dust laden air to said housing, means for distributing said air within said housing, a screened discharge ventilator in communication with said housing, a screened air compartment formed within said housing and hingedly connected thereto, means for vibrating the walls of said compartment, and a second discharge ventilator extending from said air compartment through said housing.

7. A dust separator and collector comprising a housing, means for admitting dust laden air therein, fixed means within said housing for separating the dust from said air, a screened discharge ventilator in communication with said fixed dust separating means, a vibrating dust separating means within said housing, and a second discharge ventilator in communication therewith.

In testimony whereof I affix my signature.

CHARLES A. KUNZ.